A. L. STEWART AND R. W. POWELL.
TIRE HOLDER.
APPLICATION FILED APR. 23, 1921.
1,406,296. Patented Feb. 14, 1922.
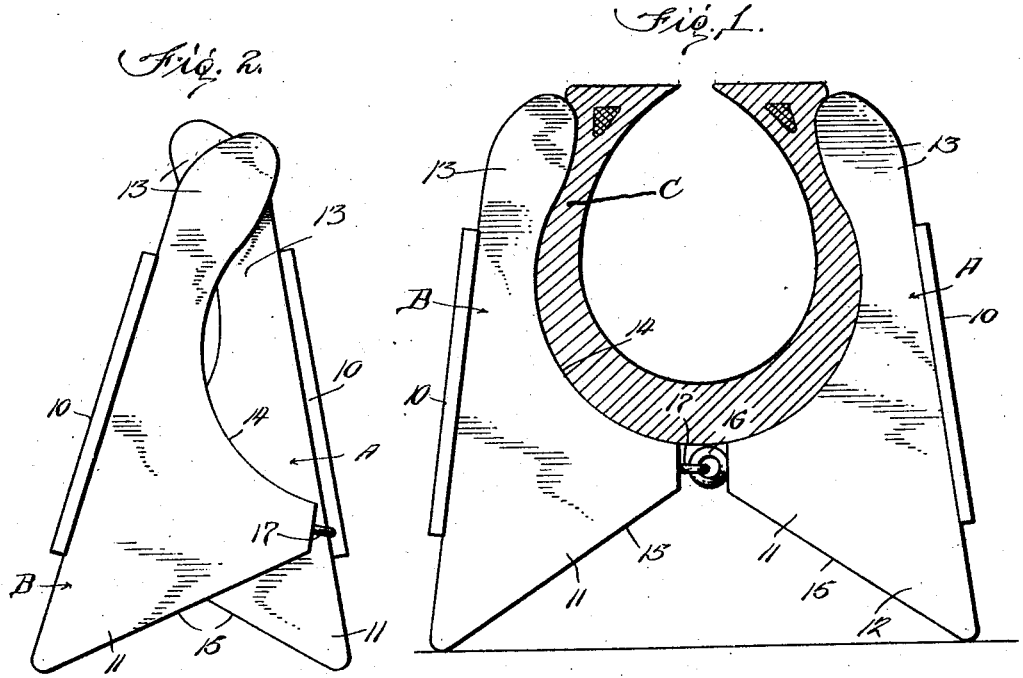
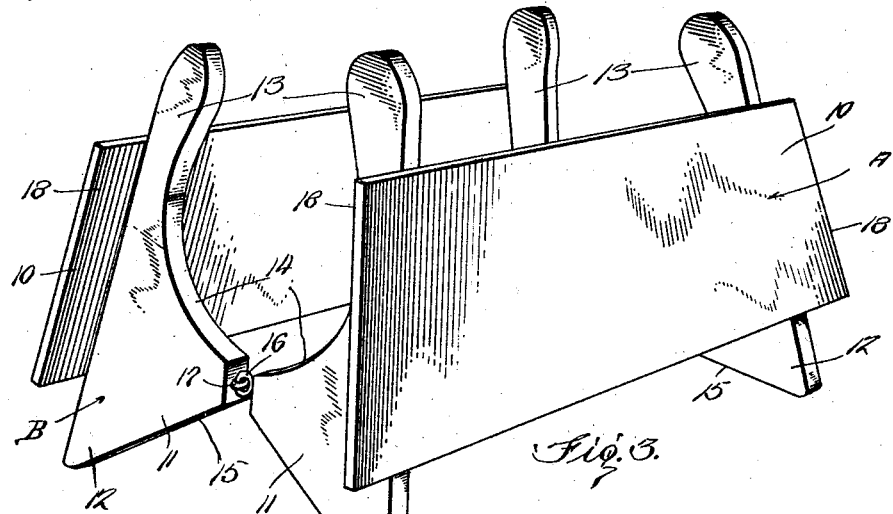
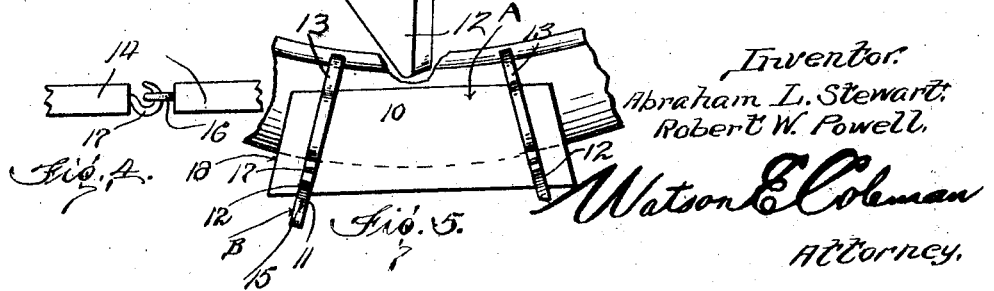
Inventor:
Abraham L. Stewart,
Robert W. Powell,
Watson E. Coleman
Attorney.

UNITED STATES PATENT OFFICE.

ABRAHAM LINCOLN STEWART AND ROBERT W. POWELL, OF QUINCY, ILLINOIS; SAID POWELL ASSIGNOR TO SAID STEWART.

TIRE HOLDER.

1,406,296.  Specification of Letters Patent.  Patented Feb. 14, 1922.

Application filed April 23, 1921. Serial No. 463,996.

*To all whom it may concern:*

Be it known that we, ABRAHAM LINCOLN STEWART and ROBERT W. POWELL, citizens of the United States, residing at Quincy, in the county of Adams and State of Illinois, have invented certain new and useful Improvements in Tire Holders, of which the following is a specification, reference being had to the accompanying drawings.

This invention relates to devices or racks for holding or supporting automobile tires or like objects, and particularly to that type of support wherein oppositely disposed tire gripping members are provided which rest upon the floor and which are urged toward each other to grip the tire between them.

The general object of the present invention is to improve upon constructions of this character by providing a holding device formed in two sections, which sections may be readily connected to each other or disconnected from each other so that in the latter case they may be packed for shipment or for storage.

A further object is to provide a device of this character provided with means which will more securely grip the object, as for instance the automobile tire, and in which the weight of the tire causes the gripping means to grip the tire and hold it securely.

And a further object is to provide a construction of this character which will fit the curvature of an automobile tire more securely and which may be used either in pairs or in a series to hold one object or a number of objects.

Other objects will appear in the course of the following description.

Our invention is illustrated in the accompanying drawings, wherein:—

Figure 1 is an end elevation of our improved tire holder;

Figure 2 is an end elevation showing the tire holder collapsed ready for transportation;

Figure 3 is a perspective view of the tire holder;

Figure 4 is a fragmentary top view showing the hook and eye for connecting the two sections of the tire holder;

Figure 5 is a fragmentary elevation with one of the sections of the holder removed showing the tire in place therein.

Referring to these drawings, it will be seen that our improved tire holder or support comprises two separate sections A and B which are alike in all essential respects. Each of these sections consists of a panel 10 extending horizontally, and gripping members 11 disposed adjacent the ends of the panel 10 and extending inward therefrom. Each of these gripping members is formed, as illustrated in Figure 1, to provide a downwardly extending leg portion 12 and a gripping portion 13 whose inner face is concave, as at 14, to fit the curvature of a tire. The under edge face of the member 13 is upwardly inclined, as at 15, and the two sections A and B are joined to each other by a pivotal connection formed by eyes 16 disposed in the inner edge faces the members 13 and by hooks 17 disposed in the adjacent edge faces of the other members 13 of the opposite panel.

Preferably the gripping members 13 are inclined upward toward each other so as to be disposed in upwardly convergent relation and the extremities of the panels 10 are likewise upwardly inclined or bevelled, as at 18.

In the use of this device, the two members A and B are joined to each other by means of the hooks and eyes 17 and 16 respectively so that thus the two panels have pivotal engagement with each other and may rock upon the fulcrums formed by the approximately angular lower corners of the legs 12. When an automobile tire C is disposed in this holder, it is obvious that the weight of the tire will be borne by the inwardly projecting portions of the members 13, which will cause these members to tend to rock upon the fulcrums formed by the lower ends of the legs and cause the upper portions of the members to be forced inward into close engagement with the tire. Thus the weight of the tire acts to close the clamping members 13 against the tire, and the heavier the tire the more rigidly will the tire be supported. Inasmuch as the pairs of members 13 at opposite ends of the device are arranged in upwardly convergent relation, it is obvious that the tire will be firmly supported against any tendency of the holder to tip upward at one or the other end and that the inclination of these pairs of members 13 will also tend to cause them to more firmly bind or clamp upon the tire.

Furthermore, inasmuch as the tire engaging faces 14 of the members are disposed at an inclination to the horizontal, it is obvious that the whole edge face 14 will bear against the tire and not a corner of this edge face, as it would be if these edge faces were horizontal, that is if the members 13 were vertical. This is plainly illustrated in Figure 5.

By providing the eyes 16 and the hooks 17, we eliminate the necessity of using any tools, bolts, rods, lugs, hinges or pivot pins for connecting the two sections A and B, and this construction furthermore permits of the two sections being readily unhooked from each other and nested with relation to each other, as illustrated in Figure 2, for shipment or storage, thus greatly reducing the space occupied by these devices in shipping them or storing them. The blank spaces of the panels 10 may be utilized for bearing indicia indicating numbers, sizes, grades, etc., of the tires so supported.

The material of the holders may be of wood, metal, or any other material having sufficient strength to sustain the weight of the object to be held, and obviously the weight of the holder may be varied to correspond to the object and weight.

While we have illustrated only two pairs of gripping members 13, it is obvious that these gripping members either may be used in pairs or in a series to thereby hold one object or a number of objects. Obviously we do not wish to be limited to the details of construction illustrated and to the particular form and arrangement of the parts, as these may be varied in many ways without departing from the spirit of the invention.

We claim:—

1. A support of the character described formed of two oppositely disposed sections, each of said sections having upwardly convergent gripping members attached thereto, the gripping members of the two sections lying in the same plane and confronting each other, the gripping members of one section having hooks projecting therefrom and the gripping members of the other section having eyes projecting therefrom with which said hooks coact to swingingly connect it with the opposite gripping members, said hooks being open to permit the ready engagement or disengagement of the eyes therewith or therefrom.

2. A support of the character described including two oppositely disposed sections, each section comprising a longitudinally extending panel, spaced, upwardly convergent gripping members attached thereto and extending above and below the panel, each gripping member having its lower edge upwardly inclined from its lower outer corner and then having its edge concavely curved to form a gripping jaw, the upper end of each gripping jaw being formed with a convexly curved inwardly extending portion adapted to fit against the outer face of the base of the tire, eyes projecting from the inner edge face of one set of gripping members just above the upwardly inclined lower edge thereof, and open hooks projecting from the other set of gripping members just above the lower inclined edge face thereof and adapted to engage said eyes, the hooks being open to permit the ready disengagement or engagement of the eyes therewith or therefrom.

In testimony whereof we hereunto affix our signatures.

ABRAHAM LINCOLN STEWART.
ROBERT W. POWELL.